Dec. 19, 1967  W. WESTERHEIDE  3,359,012
TWO-WHEEL VEHICLE HAVING SEPARABLE FRAME PARTS
Filed Nov. 20, 1964  2 Sheets-Sheet 1
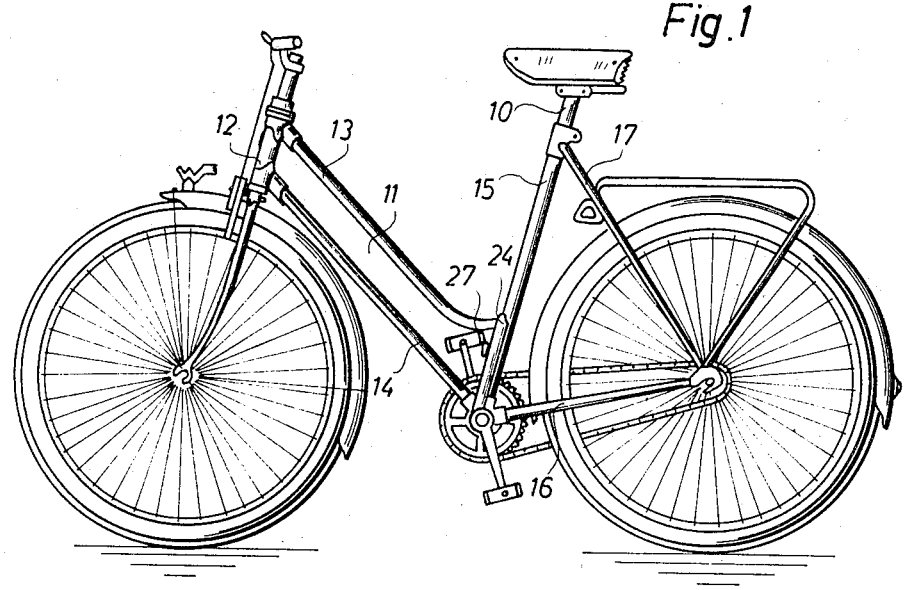
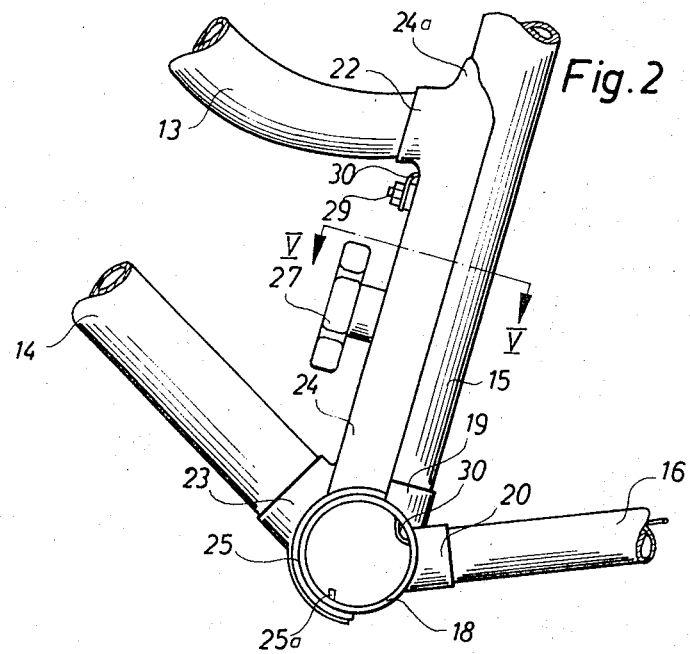
Inventor:
WALTER WESTERHEIDE
By Lowry & Rinehart
ATTYS.

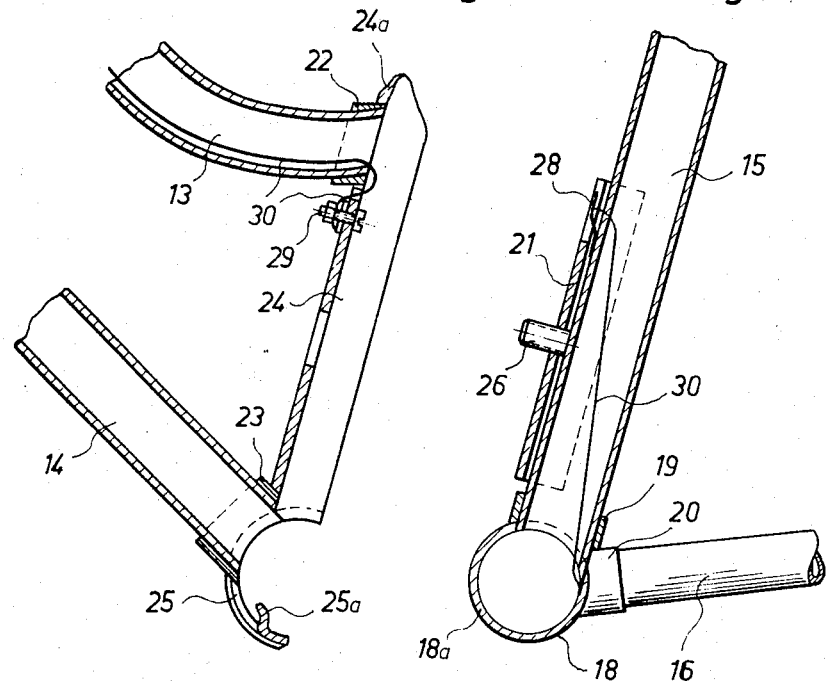
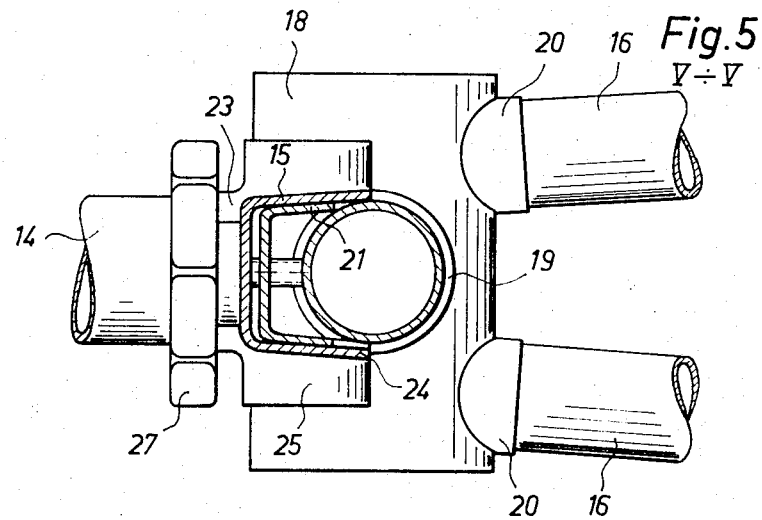

United States Patent Office 3,359,012
Patented Dec. 19, 1967

3,359,012
TWO-WHEEL VEHICLE HAVING SEPARABLE
FRAME PARTS
Walter Westerheide, 16 Flensburger Strasse,
Bielefeld, Germany
Filed Nov. 20, 1964, Ser. No. 412,805
Claims priority, application Germany, Feb. 5, 1964,
W 32,071
19 Claims. (Cl. 280—287)

This invention relates to two-wheel vehicles, and more specifically to a bicycle having a two-part frame.

One object of the invention is to provide a two-wheel vehicle which can be disassembled and again assembled in a particularly simple manner.

Another object of the invention is to provide a two-wheel vehicle having a two-part frame which is made resistant to torsion by special means.

A further object of the invention is to provide a coupling for connecting the two frame parts which prevents shifting, twisting or loosening and thus rattling of the frame parts.

According to still another object of the invention, the coupling members should be incorporated in the frame structure so as not to form protruding parts in order to avoid injury.

To achieve these objects, the invention provides a two-wheel vehicle, particularly bicycle, which has a frame separable into two parts, the two frame halves being coupled together in the region of the bottom bracket bearing.

In a preferred form of construction, the leading frame half forms a coupling member of segmental, preferably semicircular cross section and engaging around the bottom bracket bearing housing. This coupling member may be equipped in its lower region with a locking nose or the like engaging in a recess in the bottom bracket bearing housing.

According to an important feature of the invention, a clamping member is arranged above the coupling member, which clamping member connects the two down tubes of the bicycle frame and opens toward the seat tube of the frame. A supporting block or the like secured to the seat tube may engage into this clamping member and may be held therein under the action of pressure owing to the conical construction of one part or both parts. This results in a connection or coupling of the two frame parts which reliably prevents any shifting, twisting or loosening and thus rattling of parts even after a long period of use.

The coupling member with locking nose and the clamping member provide a connection of the two frame parts which prevents the character of a collapsible bicycle or a bicycle capable of being disassembled from becoming visible. The coupling members are adapted harmonically to the tubes of the bicycle frame and the bottom bracket bearing housing without projecting disturbing parts being formed.

After loosening a safety screw which may be optionally arranged, the two halves can be swung against one another in the plane of the frame with the center of rotation being located in the bottom bracket bearing housing, until they assume a certain angular position so that the locking nose is disengaged. The invention discloses considerable advantages not only in structural respects but also as regards manufacture, for only few parts of simple construction are required for the disassemblage in comparison with the conventional bicycle design. Hinge-joints susceptible to trouble are completely dispensed with.

A preferred embodiment of the invention will now be described by way of example and with reference to the accompanying drawings, in which:

FIG. 1 is a side elevational view of a two-part two-wheel vehicle according to the invention;

FIG. 2 is a side elevational view of the two coupling members in the coupling region;

FIG. 3 is a vertical section through the clamping member connecting the two down tubes of the frame;

FIG. 4 is a vertical section through the seat tube with the supporting block thereon, and FIG. 5 is a horizontal section through the seat tube taken on the line V—V of FIG. 1, with the clamping member being engaged over the supporting block.

With reference now to the drawings, a bicycle 10 has in a known manner a frame 11 which substantially comprises a head tube 12, down tubes 13 and 14, a seat tube 15, chain stays 16 and seat stays 17, a bottom bracket bearing housing 18 being arranged in the joint area of the chain stays 16, the seat tube 15 and the down tube 14.

The bottom bracket bearing housing 18 is firmly connected with the seat tube 15 and the chain stays 16 by means of socket pieces 19 and 20 fixed to the bottom bracket bearing housing 18. Above the socket piece 19 a supporting block 21 or the like is secured, preferably by welding, to the seat tube 15 so that it faces the down tubes 13 and 14. This supporting block 21 is formed of a U-shaped metal sheet which is welded with the free ends of its legs to the seat tube 15 and has an outwardly preferably steeply tapering conical shape.

Engaged over this supporting block 21 is a clamping member 24 of U-shaped cross section preferably adapted to the supporting block 21, said clamping member connecting the down tubes 13 and 14 by means of socket pieces 22 and 23. The angle of taper optionally provided on the clamping member 24 and/or the supporting block 21 is so selected that when these two parts are engaged with each other, they will be held together under the action of pressure which exhibits a sufficient reserve even after a long period of use of the bicycle so that there will never be a clearance between the side walls engaged with each other. However, the angle of taper should also be so dimensioned that in fact a certain clamping action between the two parts is produced but the two frame parts can always be disengaged from one another without great expenditure of force.

Fixed to the lower end of the clamping member 24 is a coupling member 25 of segmental, preferably semi-circular cross section which in the mobile state of the bicycle 10 engages over the front region of the bottom bracket bearing housing 18. A locking nose 25a which projects inwardly from the lower region of the coupling member 25 and engages in a recess 18a in the bottom bracket bearing housing 18 serves for securing the coupling member 25 in its position on the bottom bracket bearing housing. This locking nose 25a may be constructed in various ways. For example, it may project radially inwardly. However, it would be particularly advantageous to first arrange the locking nose 25a so that it extends radially inwardly and then, after the thickness of the wall of the bottom bracket bearing housing 18 has been exceeded, to bend it inwardly in the direction of the down tube 14. This ensures a particularly good seat of the coupling member 25 on the bottom bracket bearing housing 18.

As a certain distance exists between the seat tube 15 and the clamping member 24, it would be convenient to construct the upper region of the clamping member 24 as a projection 24a extending above the supporting block 21 and closely engaging the seat tube 15. This projection 24a has the function of protecting the space between the supporting block 21 consisting of a U-shaped metal sheet and the seat tube 15 from ingress of dirt from above. A further function of the projection 24a consists, however, also in providing a transition from the seat tube 15 to the clamping member 24 without the formation of protruding parts or the like thereby preventing garments from being caught by such parts and eliminating any risk of injury.

Contacts 28 and 29 of an electric lighting cable 30 for the lighting equipment of the bicycle 10 are preferably disposed in the upper region of the supporting block 21 and the clamping member 24, respectively. A particularly advantageous arrangement consists in coupling at least one of these contacts 28 and 29 to an elastically resilient element such as a spring, a rubber member or the like, so that the two contacts 28 and 29 are reliably engaged even after a long period of use of the bicycle 10 and thus constitute a reliably working current bridge.

In addition, a screw 26 or the like may be arranged on the supporting block 21, which screw extends through a bore in the clamping member 24 and firmly secures the clamping member 24 in its position on the supporting block 21 by means of a nut 27 provided with a handwheel or a wing nut or the like. This safety lock is of importance only when an abnormal load on the bicycle 10 occurs, e.g. when carrying the same.

A bicycle as described above can be disassembled and assembled practically with one grip. For the former purpose, after loosening the safety screw, each bicycle half is gripped with one hand and the frame parts are swung against one another in the plane of the frame with the center of rotation being situated in the region of the locking nose 25a, until the bottom bracket bearing can be disengaged from the coupling member. The assemblage is effected analogously in reverse order. Also, accommodation of the bicycle is rather simple. If, for example, the rear trunk of an automobile does not offer sufficient space for accommodating both bicycle halves therein, at least one half can be accommodated. In this manner, a very restricted space can also be utilized with advantage for storing and parking the bicycle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein. For example, the structural design of the coupling members may be modified as desired.

I claim:

1. A two-part wheeled vehicle comprising a frame, said frame being formed by leading and trailing frame halves, said leading frame half including two down tubes, said trailing frame half including a seat tube, a bottom bracket bearing housing at a lower end portion of the down tube, recess means in the bottom bracket bearing housing, means coupling said frame halves, said coupling means including a coupling member carried by the leading frame half and is of a segmental semi-circular cross-section for engagement around the bottom bracket bearing housing, a locking nose provided at a lower portion of the coupling member, said locking nose being engaged with said recess means, said coupling member being formed by a semi-circular wall, said locking nose extending radially away from said wall and is bent into an interior of said coupling member, a clamping member arranged above and integral with the coupling member, and said clamping member connects the two down tubes of the frame and opens toward the seat tube.

2. A vehicle as claimed in claim 1, wherein socket pieces are provided on the clamping member to receive the ends of the down tubes.

3. A vehicle as claimed in claim 2, wherein a supporting block is secured to the seat tube and engages in the clamping member.

4. A vehicle as claimed in claim 3, wherein the supporting block is secured to the seat tube by welding.

5. A vehicle as claimed in claim 3, wherein the clamping member and/or the supporting block are tapered.

6. A vehicle as claimed in claim 5, wherein the clamping member and/or the supporting block have a steep angle of taper.

7. A vehicle as claimed in claim 6, wherein the clamping member and/or the supporting block have U-shaped interengaging cross sections.

8. A vehicle as claimed in claim 7, wherein a screw joint serves to secure the clamping member in its position on the supporting block.

9. A vehicle as claimed in claim 8, wherein electrical contacts for an electric lighting cable are provided on the supporting block and the clamping member.

10. A vehicle as claimed in claim 9, wherein the electrical contacts are elastically resiliently mounted.

11. A two-part wheeled vehicle comprising a frame, said frame being defined by leading and trailing frame halves, said leading frame half including a down tube, said trailing frame half including a seat tube, a bracket bearing housing at a lower end portion of said seat tube, means coupling said frame halves, said coupling means including a coupling member and a clamping member secured to said down tube, a supporting block carried by said seat tube, said coupling member being in external clamping relationship relative to said bracket bearing housing, and said clamping member being in clamping relationship with said supporting block, a screw carried by said supporting block, said screw being passed through an opening in said clamping member, and a nut threaded upon said screw for maintaining said components in assembled relationship while permitting rapid disassembly thereof.

12. A two-part wheeled vehicle comprising a frame, said frame being defined by leading and trailing frame halves, said leading frame half including a down tube, said trailing frame half including a seat tube, a bracket bearing housing at a lower end portion of said seat tube, means coupling said frame halves, said coupling means including a coupling member and a clamping member secured to said down tube, a supporting block carried by said seat tube, said coupling member being in external clamping relationship relative to said bracket bearing housing, and said clamping member being in clamping relationship with said supporting block, said bracket bearing housing being apertured, and said coupling member including a locking nose received in said apertured housing.

13. A two-part wheeled vehicle comprising a frame, said frame being defined by leading and trailing frame halves, said leading frame half including a down tube, said trailing frame half including a seat tube, a bracket bearing housing at a lower end portion of said seat tube, means coupling said frame halves, said coupling means including a coupling member and a clamping member secured to said down tube, a supporting block carried by said seat tube, said coupling member being in external clamping relationship relative to said bracket bearing housing, and said clamping member being in clamping relationship with said supporting block, said leading frame half including another down tube, and said clamping and coupling members being fixed to said down tubes.

14. A two-part wheeled vehicle comprising a frame, said frame being defined by leading and trailing frame halves, said leading frame half including a down tube, said trailing frame half including a seat tube, a bracket bearing housing at a lower end portion of said seat tube, means coupling said frame halves, said coupling means including a coupling member and a clamping member secured to said down tube, a supporting block carried by said seat tube, said coupling member being in external clamping relationship relative to said bracket bearing housing, and said clamping member being in clamping relationship with said supporting block, said clamping member and said supporting block being each generally U-shaped in transverse section, and said clamping member and supporting block being in mating engagement and open in the same direction.

15. A two-part wheeled vehicle comprising a frame, said frame being defined by leading and trailing frame halves, said leading frame half including a down tube, said trailing frame half including a seat tube, a bracket bearing housing at a lower end portion of said seat tube, means coupling said frame halves, said coupling means including a coupling member and a clamping member secured to said down tube, a supporting block carried by said seat tube, said coupling member being in external clamping relationship relative to said bracket bearing housing, and said clamping member being in clamping relationship with said supporting block, said leading frame half including another down tube, said clamping and coupling members being fixed to said down tubes, said bracket bearing housing being apertured, and said coupling member including a locking nose received in said apertured housing.

16. A two-part wheeled vehicle comprising a frame, said frame being defined by leading and trailing frame halves, said leading frame half including a down tube, said trailing frame half including a seat tube, a bracket bearing housing at a lower end portion of said seat tube, means coupling said frame halves, said coupling means including a coupling member and a clamping member secured to said down tube, a supporting block carried by said seat tube, said coupling member being in external clamping relationship relative to said bracket bearing housing, and said clamping member being in clamping relationship with said supporting block, fastening means being provided between said bracket bearing housing and said coupling means, and fastening means being also provided between said clamping member and said supporting block.

17. A two-part wheeled vehicle comprising a frame, said frame being defined by leading and trailing frame halves, said leading frame half including a down tube, said trailing frame half including a seat tube, a bracket bearing housing at a lower end portion of said seat tube, means coupling said frame halves, said coupling means including a coupling member and a clamping member secured to said down tube, a supporting block carried by said seat tube, said coupling member being in external clamping relationship relative to said bracket bearing housing, and said clamping member being in clamping relationship with said supporting block, fastening means being provided between said bracket bearing housing and said coupling means, fastening means also being provided between said clamping member and said supporting block, said last-mentioned fastening means being screw and nut means, and said first-mentioned fastening means being a locking nose of said coupling member passed through an aperture in said bracket bearing housing.

18. A two-part wheeled vehicle comprising a frame, said frame being formed by leading and trailing halves, said leading frame halves including two down tubes, said trailing frame half including a seat tube, a bottom bracket bearing housing at a lower end portion of the down tube, recess means in the bottom bracket bearing housing, means coupling said frame halves, said coupling means including a coupling member carried by the leading frame half which is of a segmental semi-circular cross-section for engagement around the bottom bracket bearing housing, locking means at a lower portion of the coupling member, said locking means being engaged with said recess means, said coupling member being formed by a semi-circular wall, said locking means extending radially away from said wall and being bent into an interior of said coupling member, a clamping member arranged above the coupling member, said clamping member connecting the two down tubes of the frame and opening toward the seat tube, a screw carried by said supporting block, said screw being passed through an opening in said clamping member, and a nut threaded upon said screw for maintaining said components in assembled relationship while permitting rapid disassembly thereof.

19. A two-part wheeled vehicle comprising a frame, said frame being formed by leading and trailing halves, said leading frame halves including two down tubes, said trailing frame half including a seat tube, a bottom bracket bearing housing at a lower end portion of the down tube, recess means in the bottom bracket bearing housing, means coupling said frame halves, said coupling means including a coupling member carried by the leading frame half which is of a segmental semi-circular cross-section for engagement around the bottom bracket bearing housing, locking means at a lower portion of the coupling member, said locking means being engaged with said recess means, said coupling member being formed by a semi-circular wall, said locking means extending radially away from said wall and being bent into an interior of said coupling member, a clamping member arranged above the coupling member, said clamping member connecting the two down tubes of the frame and opening toward the seat tube, said clamping member and said supporting block, each being generally U-shaped in transverse section and said clamping member and supporting block being in mating engagement and open in the same direction.

References Cited

UNITED STATES PATENTS

| | | | |
|---|---|---|---|
| 1,906,385 | 5/1933 | Ledig | 280—281 |
| 2,440,091 | 4/1948 | Hoyt | 280—287 |

FOREIGN PATENTS

| | | |
|---|---|---|
| 625,611 | 1/1963 | Belgium. |
| 2,607 | 1898 | Great Britain. |
| 651,132 | 10/1928 | France. |
| 822,328 | 9/1937 | France. |
| 1,012,713 | 4/1952 | France. |

KENNETH H. BETTS, *Primary Examiner.*